Jan. 27, 1970    W. W. DOLLISON    3,491,831
SUBSURFACE SAFETY VALVE WITH OPERATOR
Filed June 22, 1967    5 Sheets-Sheet 1

INVENTOR
William W. Dollison

BY
ATTORNEYS

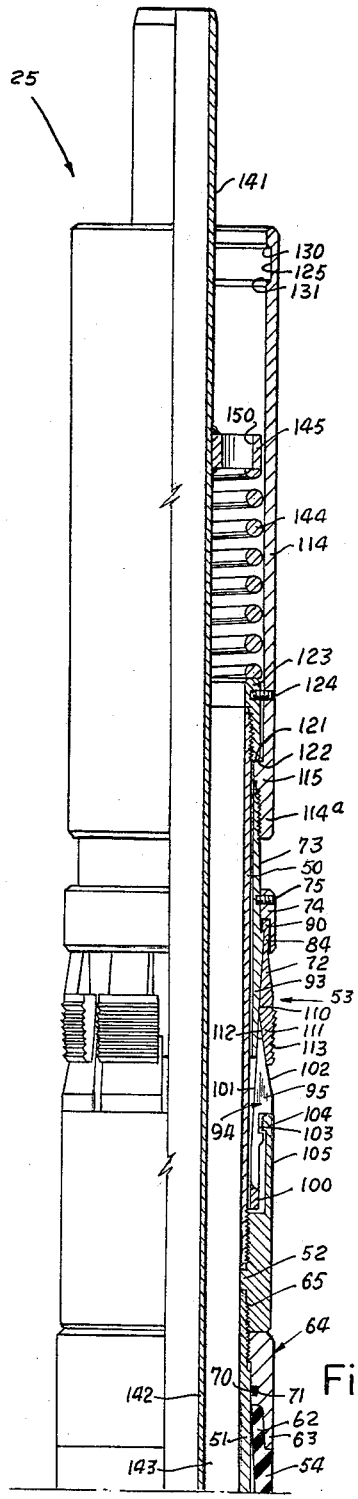

Jan. 27, 1970  W. W. DOLLISON  3,491,831
SUBSURFACE SAFETY VALVE WITH OPERATOR
Filed June 22, 1967  5 Sheets-Sheet 3

INVENTOR
William W. Dollison
BY Hastings Ackley
and
Walter J. Jag
ATTORNEYS

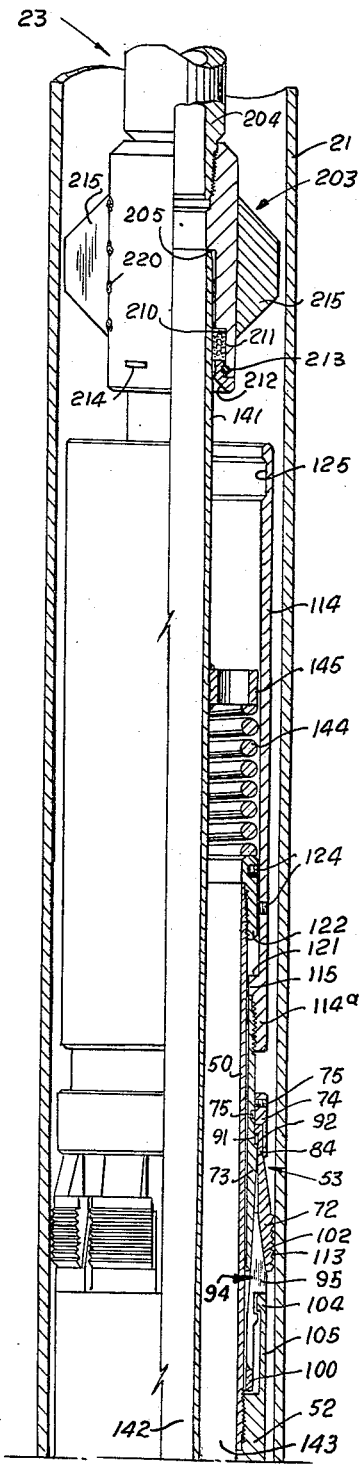

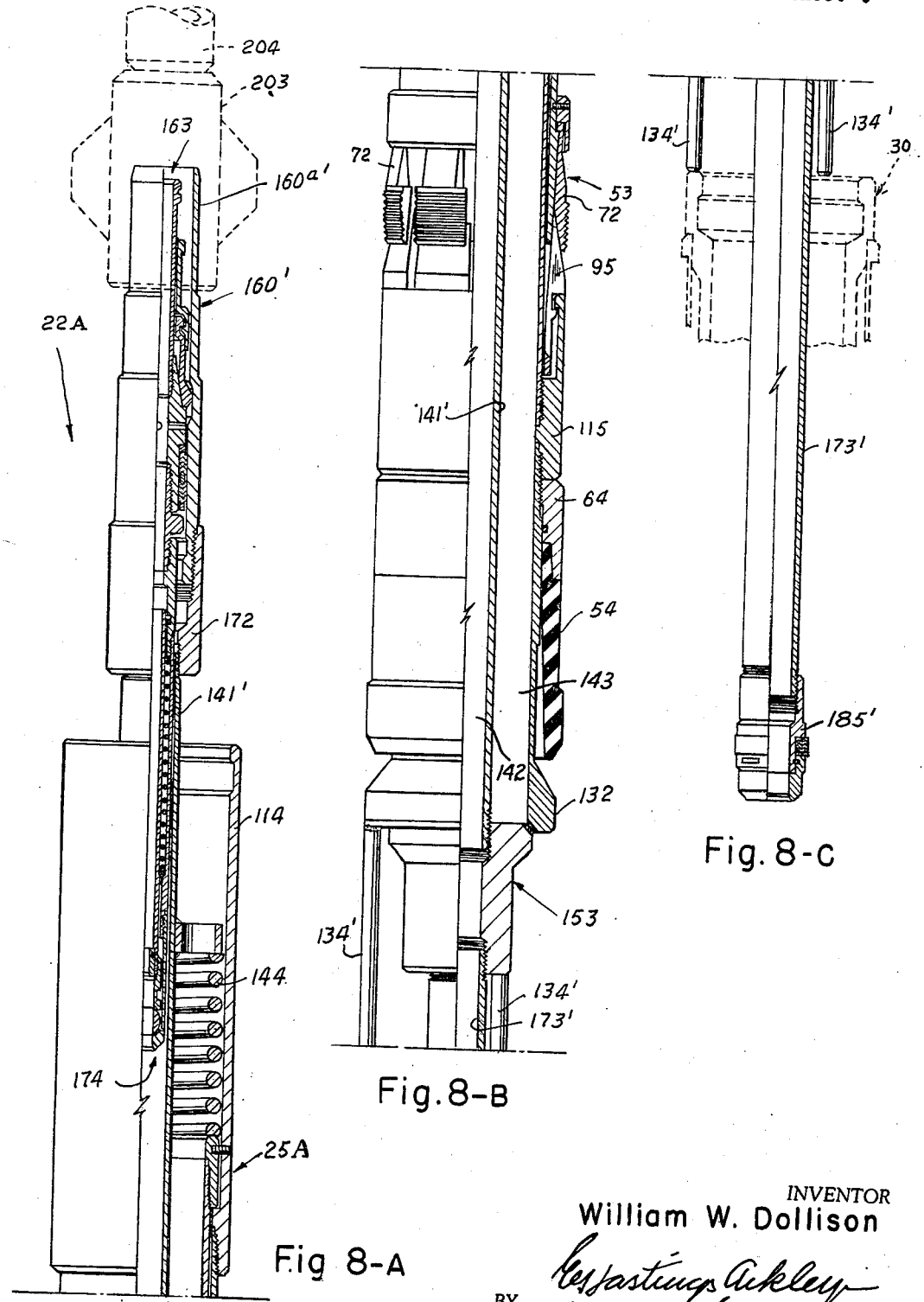

United States Patent Office 3,491,831
Patented Jan. 27, 1970

3,491,831
SUBSURFACE SAFETY VALVE WITH OPERATOR
William W. Dollison, 3792 High Vista,
Dallas, Tex. 75234
Filed June 22, 1967, Ser. No. 648,110
Int. Cl. E21b *33/03, 33/128*
U.S. Cl. 166—72
22 Claims

ABSTRACT OF THE DISCLOSURE

A surface controlled subsurface safety valve including a longitudinally movable valve in a body having external packing for sealing around the body within a flow conductor. The valve is spring biased toward closed position and held open by an operator member extending in the flow conductor from a control unit at the surface to the valve. The safety valve has a tubing hanger unit supporting a tubing string communicating with the operator member to permit fluid circulation through the tubing in one direction and the casing annulus in the other direction. The surface control unit is responsive to a predetermined condition for allowing the valve to close.

---

This invention relates to well tools and more particularly relates to a remotely controlled valve device.

It is an object of the present invention to provide a device for controlling flow through a flow conductor.

It is another object of the invention to provide a subsurface flow control device controlled from the surface.

It is another object of the invention to provide a subsurface valve through which well operations may be conducted below the valve without removing it from the well.

It is another object of the invention to provide a safety valve including a tubular mandrel, an annular seal on the mandrel, upper locking means on the mandrel, a valve member in the mandrel biased toward closed position by a spring, a tubing hanger unit below the valve member including locking means for holding at an open position and providing communication to a tubing string supported from the hanger unit and means at the surface for actuating the operating tube.

It is another object of the invention to provide a subsurface flow control device including a tubing hanger for supporting a string of tubing within a well below the flow control device, seal means for sealing between the device and a well casing, and a valve movable between open and closed positions by an operator tube extending from the surface, the operator tube being in communication with the tubing string supported below the device whereby fluid may be circulated in the well in one direction through the casing annulus and in the other direction through the tubing string, valve, and operator tube.

It is another object of the invention to provide a hanger unit for supporting tubing within a well bore.

Additional objects and advantages of the invention will be readily apparent from the reading of the following description of a device construction in accordance with the invention, and reference to the accompanying drawings thereof, wherein:

FIGURE 1 is a longitudinal schematic view in section and elevation illustrating a well system including a subsurface safety valve embodying the invention;

FIGURES 2–A and 2–B taken together constitute a longitudinal view in section and elevation of only the packer unit of the subsurface safety valve in its running-in condition with the annulus valve closed and its locking slips retracted;

FIGURE 3 is a longitudinal view in section and elevation of only the tubing hanger unit of the subsurface safety valve coupled with a handling tool as run into a well into a well casing;

FIGURES 4–A, 4–B and 4–C taken together constitute a longitudinal view in section and elevation of the subsurface safety valve latched in operating position within a well casing with its annulus valve held open as illustrated diagrammatically in FIGURE 1;

Figure 7:
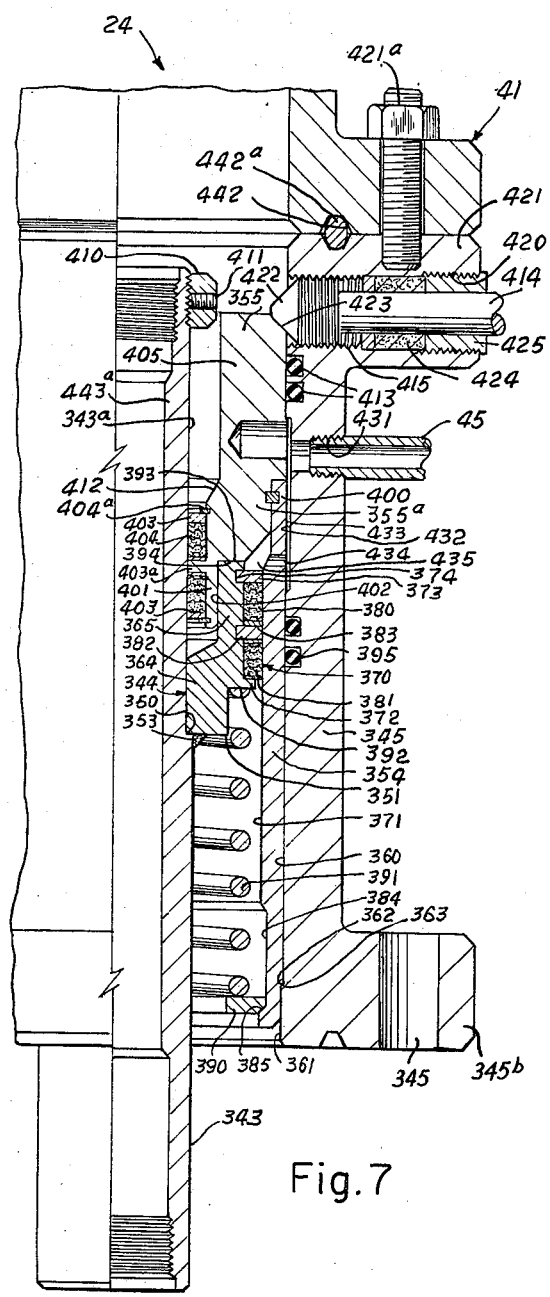

FIGURE 7 is a fragmentary longitudinal view in section and elevation of a surface located piston control unit for moving the subsurface safety valve from its closed to its open position and holding the valve open; and FIGURES 8–A, 8–B and 8–C taken together constitute a fragmentary longitudinal view in section and elevation of a modified form of packer unit showing the unit with its annulus valve closed.

Referring to the drawings, a well flow system 20 disposed in a well casing 21 includes a subsurface safety valve 22 embodying the invention controlled by an operator assembly 23 extending from a pressure actuated piston control unit 24 at the surface. The subsurface safety valve includes a packer unit 25 and a tubing hanger unit 30 which supports a string of tubing 31 extending downwardly from the safety valve. The operator assembly 23 together with flow passage means provided through the safety valve 22 and the tubing string 31 define a tubing flow passage 32 extending from the surface and opening through the lower end of the tubing string, while the space within the well casing around the tubing string above and below the safety valve along with annular passage means through the safety valve define an annular flow passage 33. The tubing and annular flow passages may both be used for flow from the well or for well circulation procedures such as "killing" the well, with one of the passages serving for flow in one direction while the other of the passages functions as a return flow passage.

The piston control unit 24 is supported on a flow T 34 connected with a line 35 having a valve 40 for controlling communication into the annular flow passage 33. Another valve 41 is connected on the piston unit and to a conduit 42 for communication through the piston unit into the tubing flow passage 32. The flow T 34 is supported on a master valve 43 used to shut the well in when the operator assembly 23 is not disposed through the master valve. The piston unit is connected with a source of control fluid pressure 44 by a line 45 for supplying fluid pressure into the piston unit 24 to hold the operator assembly 23 at a lower end position for holding the annular valve of the safety valve 22 at its open position. As discussed in detail hereinafter, a reduction in the fluid pressure within the piston unit by a monitoring system, not shown, reduces the pressure within the piston unit allowing the safety valve to move to its closed position.

Referring to FIGURES 2–A and 2–B, the packer unit 25 has a tubular mandrel including upper and lower members 50 and 51, respectively, threaded into a connecting slip-expander retainer 52. The mandrel supports a slip assembly 53 for locking the safety valve against upward movement in a well casing and packing 54 for sealing around the safety valve within the well casing.

The packing 54 is a generally tubular shaped flexible member formed of material such as rubber and having a lower outer annular boss portion 55 providing an external cylindrical seal surface 60 of a sufficiently large diameter to form a tight or "interference" fit with the inside wall surface of the well casing so that under static conditions the packing seals with the internal surface of the casing. The packing has a downwardly flaring internal surface portion 61 exposed to well pressure from below which, if higher than the pressure above the packing, biases it outwardly proportional to the pressure differential applied across the packing. The packing has a reduced upper end portion 62 disposed within a downwardly extending annular cup 63 on a retainer 64 threaded on an upper end portion 65 of the mandrel 51 below the coupling 52. A ring seal 70 disposed within an internal annular recess 71 of the retainer 64 seals between the retainer and the outer surface of the mandrel 51 above the packing 54.

Figure 5:
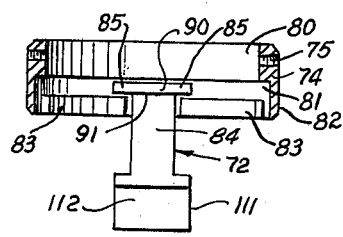
FIGURE 5 is a view in section and elevation showing inside surface portions of the slip carrier and one of the slips of the packer unit.

The slip assembly 53 includes a plurality of circumferentially spaced slips 72 supported around an expander wedge and slip release sleeve 73 by an annular slip carrier 74 slidably disposed on the sleeve 73 and releasably secured by one or more shear pins 75 to the sleeve prior to the setting of the slips. Referring to FIGURE 5, the slip carrier has an upper bore portion 80 fitting in sliding relationship around the sleeve 73. The slip carrier has a larger lower bore portion 81 and coaxial within a skirt portion 82 with the upper bore portion in which head portions of the slips are disposed. The slip carrier has internal flange portions 83 circumferentially spaced so that a slip head portion is disposed between adjacent edge surfaces of each pair of flange portions so that the slips are loosely supported by and dependent from the slip carrier. A portion of a central handle section 84 of each slip extends between adjacent internal flanges of the slip carrier. Each of the slips has laterally extending head portion tabs 85 which engage the top edge surface of adjacent internal slip carrier flanges holding the slips against downward movement relative to the carrier. Each of the slips has an internal flange portion 90 within its head end defining a downwardly facing shoulder surface 91 engageable by an external annular flange 92 at the upper end of a downwardly tapered lower portion 93 of the sleeve 73. During release of the packer unit from the well casing, the shoulder 92 of the sleeve 73 engages shoulder 91 of the slips for releasing them and lifting them and the slip carrier.

A slip expander 94 is loosely supported around the upper mandrel member 50 by the retainer 52 for expanding the slips as they move downwardly on the expander. The expander is a collet-type member having a plurality of upwardly extending circumferentially spaced resilient expander fingers 95 on a base ring portion 100. Each of the fingers has an internal upwardly and outwardly extending wedge engaging surface 101 and an external upwardly and inwardly sloping slip expander surface 102 converging toward its upper end. Each finger 95 also has a central external recess portion 103 which receives an internal annular flange 104 at the upper end of an upwardly extending skirt portion 105 of the retainer 52. The skirt portion 105 encompasses the base ring 100 and a substantial adjacent portion of the fingers of the collet, 94. The collet expander fingers are sufficiently resilient that they bend inwardly to the extent necessary for inserting the expander into the skirt portion of the retainer 52 until the flange 104 of the retainer is disposed within the recess portions 103 of the fingers. The internal wedge surface 101 on each of the fingers is engageable by a downwardly and inwardly sloping external surface 110 on the sleeve 73 for camming the expander fingers outwardly as the sleeve moves downwardly into the expander. Each of the slips has a lower body or locking portion 111 provided with an internal downwardly and outwardly sloping wedge surface 112 engageable by an external expander finger surface 102 for camming the slip outwardly toward the inner wall of the casing. Each of the slip body portions has upwardly facing external teeth 113 for gripping the internal wall surface of the casing to hold the safety valve against upward movement when the valve is at its locked position. The slope and spacing of the external expander sleeve surface 110 and the internal slip surfaces 112 are so related that an expander finger 95 is received between the sleeve 73 and each of the slips as the slips and sleeve are both forced downwardly toward the slip expander.

A head and setting sleeve 114 is threaded at its lower end portion 114a on an upper end portion of the expander sleeve 73. The setting sleeve has an internal annular flange 115 providing a downwardly facing shoulder surface engageable with the upper end surface of the expander sleeve 73 limiting the extent to which the setting sleeve is threaded on the expander sleeve. The flange 115 also provides an upwardly facing shoulder surface 121 engageable with a lower end edge surface 122 of a retainer 123 threaded on an upper end portion of the upper mandrel member 50. The retainer 123 holds the setting sleeve 114 on the mandrel and limits the upward movement of the sleeve while the setting sleeve is free to telescope downwardly over the mandrel. The setting sleeve is initially secured to the retainer by a shear screw 124 which is severed by a downward force on the sleeve for actuating the slips 53, as discussed in further detail hereinafter. An internal annular locking recess 125 between an upper internal shoulder surface 130 and a lower internal shoulder surface 131 is provided near the upper end of the setting sleeve to receive locking means on a running tool of the type illustrated in FIGURE 3 for installing the packer unit in a well.

A lower end portion 132 of the lower mandrel member 51 is increased in outside diameter providing a thickened wall portion having an internal annular downwardly and outwardly sloping valve seat surface 133. A plurality of longitudinal circumferentially spaced support and spacer rods 134 are each secured as by welding at 135 to the lower end face 140 of the mandrel member 51. The lower ends of the rods engage the upper end surface of the hanger unit 30 as shown in FIG. 4–C for supporting the packer unit on and properly spacing it from the hanger unit.

A longitudinal valve tube 141 is movably disposed in concentric spaced relationship within the packer unit mandrel providing a central tubing flow passage 142 and with the mandrel defining an annular flow passage 143 through the unit. The valve tube is supported on and biased upwardly by a spirng 144 confined between the upper end of the retainer 123 and a guide and support ring 145 suitably secured, as by welding on the valve tube. The ring 145 has a plurality of longitudinally oriented circumferentially spaced ports to permit flow therepast in the annular passage 143. The valve tube extends above the setting sleeve 114 a sufficient distance to allow the operator tube assembly 23 to telescope over and seat on its upper end portion as shown in FIG. 4–A without restricting the annular flow passage 143 when the valve tube is at its lower end position. A lower guide ring 151 is suitably secured as by welding on the valve tube near the lower end of the lower mandrel member 51 to maintain the coaxial alignment of the valve tube as it moves between its upper and lower end positions within the mandrel. The lower guide ring also has longitudinally extending circumferentially spaced ports 152 for flow past the ring within the annular passage 143.

An annular valve 153 having enlarged head portion 154 and a reduced internally threaded body portion 155 is threaded on a lower end portion of the valve tube 141 below the lower end of the lower mandrel member 51. The head portion of the valve is larger in diameter than the bore of the mandrel member 51 and has an upwardly inwardly sloping external annular valve seat surface engageable with the mandrel member seat surface 133 at the upper end position of the valve tube for shutting off flow into the annular flow passage 143.

A landing nipple 160 provided with an internal locking recess 161 and an internal lower no-go flange 162 is threaded into the lower portion 155 of the bore of the valve 153 for receiving and supporting a locking mandrel assembly 163 in releasably locked relationship as shown in FIGS. 4–B and 4–C. The locking mandrel generally comprises a running neck 164, a pulling neck 165, locking dogs 170, packing 171, and a no-go ring 171a. Both the landing nipple and locking mandrel are standard commercial components, such as the type N or Q Otis Landing Nipples and Otis Mandrels illustrated and described at page 3816, Composite Catalogue of Oil Field Equipment and Services, 1966–67 edition, published by World Oil, Houston, Tex.

A coupling 172 threaded on a lower end portion of the landing nipple supports a tail pipe or extension tube 173 threaded at its upper end portion into the coupling. The tube 173 defines a portion of the tubing flow passage 142 through the subsurface safety valve and receives in its bore a tubing safety valve 174 supported within the landing nipple 160 and tubing by the locking mandrel 163 as shown in FIG. 4–C. The tubing safety valve generally includes an upper sub 175 threaded on the lower end of the locking mandrel, a biasing spring 180, a flow bean 181, an upper seat 182, a ball valve 183, and a lower seat 184. The valve may be a comercially available valve, such as the type J. Otis Tubing Safety Valve illustrated and described at page 3837 of the Composite Catalogue of Oil Field Equipment and Services, supra. The tubing safety valve is adapted to shut responsive to a flow rate through the tubing flow passage in excess of a predetermined value. The spring 180 holds the ball valve 183 at its open position until the flow rate through the valve exceeds such rate.

A seal assembly 185 is threaded on a lower end portion of the tube 173 to provide a slidable seal with the hanger unit 30 as shown in FIG. 4–C. The seal assembly comprises an adapter 190 having a reduced lower end portion 191 providing a downwardly facing shoulder 192. Annular packing 193 is supported on the adapter reduced portion 191 against the shoulder 192 by a retainer 194 held on the adapter by a lock wire 195 disposed within longitudinally aligned external and internal recesses of the adapter and retainer. The lock wire 195 is inserted into the aligned recesses through a slot 200 provided in the retainer.

The retainer has a tapered lower end face 201 to facilitate guiding the seal assembly and tube into the hanger unit during installation of the subsurface safety valve in the well casing. The seal assembly is slidable in the hanger unit as the valve 153 is moved between open and closed position.

Referring to FIGURE 4–A, the operator tube assembly 23 which transmits force from the piston unit at the surface to the subsurface safety valve for holding it open includes a tubular seal unit 203 which slides downwardly over and seats on an upper end portion of the valve tube 141. The seal unit is threaded on the lower end of a tube 204 of the operator tube assembly and is provided with an internal annular downwardly facing stop shoulder 205 which seats on the upper end of the valve tube whereby the valve tube is forced downwardly by the seal assembly. A lower end portion of the seal unit has a downwardly opening annular recess 210 which receives annular packing 211 for sealing with the outer wall surface of the valve tube 141. The packing is held in the recess 210 by an annular retainer 212 secured within the recess by a lock wire 213 disposed in longitudinally aligned external and internal recesses in the retainer and body, respectively. The lock wire is inserted into the recesses through a slot 214 provided in the retainer in alignment with its internal recess for the wire. The seal unit also includes a plurality of circumferentially spaced external radial guide vanes 215 suitably secured on the body as by welding at 220. The guide vanes loosely fit within the casing 21 for guiding the operator tube assembly downwardly and over the upper end of the valve tube to its seated position thereon as shown in FIGURE 4–A.

Figure 3:
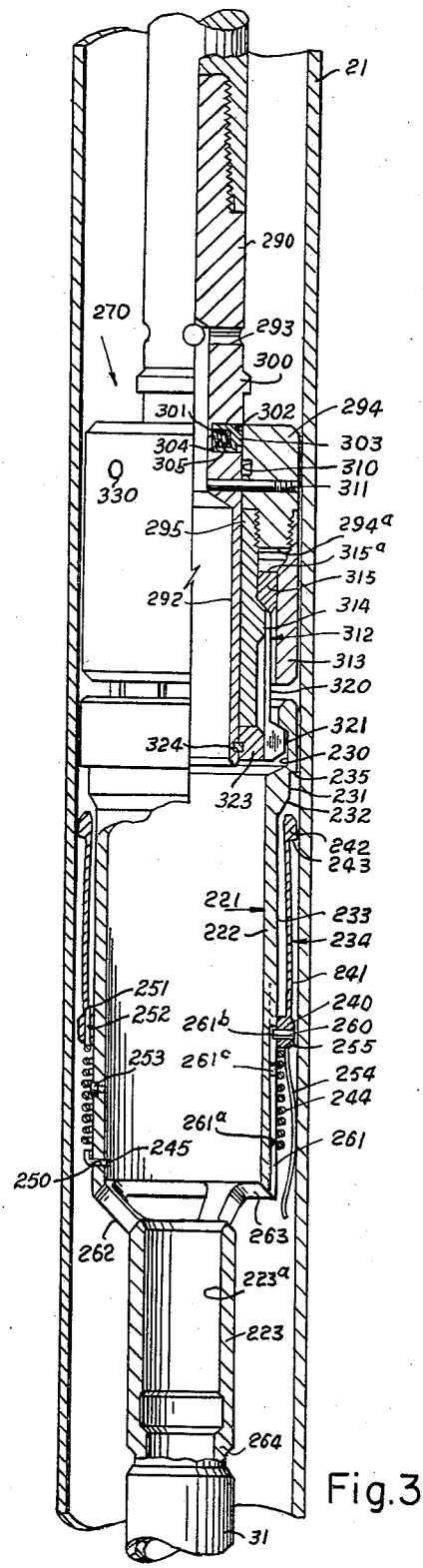

Referring to FIGURES 3 and 4–C, the hanger unit 30 includes a mandrel or body 221 comprising a large upper portion 222 and a substantially reduced lower portion 223. The upper body portion has an upper end edge surface 225 engageable by the lower ends of the spacer rods 134 on the packer unit. The upper body portion also has an internal annular locking recess 230 for receiving the locking dogs on a running tool described below. The upper body portion is reduced in outside diameter providing an external annular locking surface 231 below which the body is provided with a downwardly convergent external annular cam surface 232 and a connecting reduced diameter outside body surface 233 along which a locking collet 234 is slidably supported. The body is provided with a downwardly facing external annular stop shoulder 235 at the upper end of the locking surface 231 for limiting the upward movement of the locking collet on the body.

The locking collet 234 comprises a base ring 240 which supports a plurality of longitudinal, upwardly extending, circumferentially spaced flexible collet fingers 241. Each of the collet fingers has an enlarged head portion or boss 242 provided with a downwardly facing locking shoulder surface 243 for holding the hanger unit against downward movement by engaging in a recess 216b at a casing joint in a well casing when the collet fingers are locked at their outward or expanded positions. The collet fingers are inherently sprung inwardly so that when the collet is at its lower unlocked position, FIGURE 3, the collet fingers remain retracted inwardly around the body surface 233. The collet is loosely disposed on the body portion 222 and is biased upwardly and in a clockwise direction, as viewed from below, by a helical torsion spring 244. The spring has a radial inwardly extending lower end portion 245 received within a hole 250 in the body and a longitudinally extending upper end portion 251 disposed in a longitudinal hole 252 through the base ring 240 of the collet. A lock screw 253 in the body below the base ring holds the collet on the body and limits its downward movement thereon. A plurality of longitudinally downwardly extending circumferentially spaced springs 254 are suitably secured as by welding at their upper end portion 255 to the base ring 240 of the collet. The springs are inherently sprung outwardly so that when the hanger unit is inserted into the well casing the outer surfaces of the springs tightly slidably engage the inside wall surface of the well casing to facilitate operation of the collet in locking the hanger unit in the well casing, as discussed in detail below.

Figure 6:
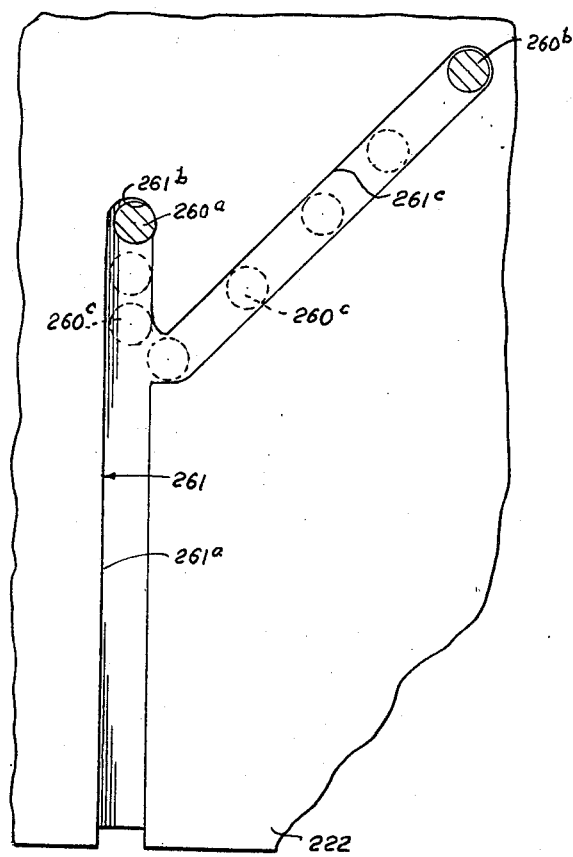
FIGURE 6 is an enlarged roll-out view in elevation of one of the guide pin slots of the hanger unit showing various positions of a guide pin in the slot as the locking collet of the hanger unit is moved between a contracted running-in position and an expanded position for locking the unit within the well casing.

The collet 234 is held at a retracted unlocked position and guided to an expanded locked position by guide pins 260 suitably secured as by welding to the base ring 240 and extending into guide slots 261 formed externally on the reduced body portion 223. The guide slots have vertical portions 261a open at their lower ends and an upper end surface 261b limiting the upward extent of movement of the guide pins in the slots on the body. The guide slots each includes a sloping release portion 261c which guides each pin as the collet is biased upwardly and rotated by the spring 244 to direct the collet to its expanded locked position. As shown in FIGURE 6, the guide pins each moves within its respective slot between a position 260a at which the collet is retracted inwardly to a position 260b in the sloping slot portions 261c, at which the collet is expanded and locked. The several broken line representations of pin positions 260c show the various positions occupied by the guide pins in their respective slots when moving between retracted and expanded collet positions. The open lower ends of the vertical portions 261a of the slots permit the guide pins to slide upwardly into the slots as the collet is assembled on the body.

The body of the hanger unit has a downwardly and inwardly sloping portion 262 connecting its upper portion 221 with its reduced lower portion 223. A plurality of ports 263 are in the portion 262 to provide flow communication into the body around the lower extension tube 173 of the packer unit when assembled with the hanger unit, FIGURE 4–A through 4–C. The lower body portion 223 has a reduced externally threaded lower end portion 264 for the connection of the tubing string 31 supported from the hanger unit.

Both the packer unit 25 and the hanger unit 30 of the safety valve are installed and removed with a handling tool 270, illustrated in FIGURE 3, coupled with the hanger unit. While the following description of the handling tool is given generally in terms of use with the hanger unit, the tool bears the same relationship with the corresponding components of the packer unit. The handling tool includes a mandrel 290 having a threaded upper end section 291 for connection with a wire line tool string, not shown. The mandrel has a blind bore 292 opening downwardly and communicating at its upper end with lateral ports 293 for fluid bypass through the tool during installation and removal procedures. The mandrel extends slidably through an annular head 294 and a collet retainer sleeve 295 threaded along an upper end portion into the head member. The mandrel has an external annular flange 300 intermediate its ends which engages the head 294 limiting the downward movement of the mandrel through the head. The mandrel also is provided with a laterally opening blind bore 301. A lock pin 302 is slidably disposed in the bore 301 and has a reduced head 303 and a tubular skirt portion 304 enclosing a spring 305 confined between the lock pin and the base of the hole for biasing the lock pin radially outwardly. The head 294 has an internal annular locking recess 310 for receiving the lock pin head 303 when the mandrel 290 is moved downwardly, aligning the hole 301 and the recess 310, in releasing the handling tool from both the hanger unit and the packer unit. The mandrel 290 is releasably secured against longitudinal movement in the head member and sleeve 295 by a shear pin 311.

A locking collet 312 is disposed around the sleeve 295 within an external sleeve 313 threaded along its upper end portion on the lower end of the head 294 in coaxial spaced relationship around the sleeve 295. The sleeve 295 has an external annular flange 314 intermediate its ends which supports an upper base ring 315 of the collet 312 from which a plurality of circumferentially spaced collet fingers 320 are dependent. Each of the collet fingers has an external locking boss 321 receivable within the locking recess 230 in the upper end of the hanger unit or the locking recess 125 in the upper end of the packer unit, FIGURE 2–A. Each of the collet fingers also has an internal locking surface on each boss engageable with the outer surface of a lock ring 323 secured on the mandrel 290 below the sleeve 295 by an annular lock wire 324 disposed within aligned external and internal recesses in the mandrel 290 and lock ring 323, respectively. The lock wire 324 is installed in the aligned recesses between the mandrel and lock ring through an outwardly opening slot, not shown, in the lock ring which permits the lock wire to be fed through the slot in the lock ring into the aligned recesses and pushed in until it is disposed within the recesses with its free ends tucked into the insertion slot. The lock ring 323 holds the collet fingers outwardly in the locking recess of the hanger unit and is movable with the mandrel 290 downwardly out of engagement with the inner locking surfaces of the collet finger bosses to release the fingers for inward movement. The head 294 and sleeve 313 are spaced apart sufficiently to allow the collet fingers to be cammed inwardly for coupling and uncoupling the handling tool and hanger unit. The head 294 has at least one radial hole 330 opening into the internal locking recess 310 for insertion of a punch or other suitable tool to engage the lock pin 302 for forcing the pin inwardly out of the locking recess 310 for resetting the tool from its release position after removal from the hanger unit subsequent to pulling the unit from the casing.

Substantial space is provided between the upper end surface 315a of the collet ring 315 and the lower end surface 294a of the head 294 for the collet to move upwardly relative to the retainer 314 and sleeve 313 to position the inner surface of the collect bosses 322 above the lock ring 323 without shearing the pins 311 to release the mandrel so that the handling tool is inserted into the hanger unit body 221 without removing or shearing the pins 311 in coupling the hanger unit and handling tool for installation and in latching the handling tool into the hanger unit when removing it from the casing.

At its upper or surface end the operator tube assembly 23 is connected into a tubular head 343 of the piston unit 24. Referring to FIGURE 7, the head 343 is secured to an annular piston 344 slidably disposed in a spool shaped body 345. The head 343 is slightly reduced in diameter along a substantial upper portion 343a providing an external upwardly facing annular shoulder surface 350 supporting the annular piston 344 by engaging its lower end face 351. The annular piston is secured to the head member 343 by welding at 353. The piston 344 slides within a liner sleeve 354 secured within the body 345 connected to an annular cylinder head or retainer 355. The bore 360 of the body 345 is slightly reduced in diameter along a short lower end portion 361 providing an upwardly facing internal annular shoulder 362 which is engaged by an external annular downwardly facing shoulder 363 on the sleeve 354 to support the sleeve in the body. An upper end portion of the sleeve 354 telescopes upwardly on a reduced lower end portion 355a of the retainer 355.

The annular piston 344 is a graduated or stepped member having a lower portion 364 of reduced diameter and an enlarged upper portion 365 on which supports an external annular seal assembly 370 for sealing with the internal wall surface of the bore 371 of the liner sleeve 354. The packing 370 is held on the annular piston between an external annular flange 372 on the lower end of the enlarged upper portion 365 of the piston and an upper split lock ring 373 disposed in an external annular recess 374 in the upper portion of the piston. The packing has upper and lower resilient seal elements 380 and 381, respectively, disposed on opposite sides of a split lock ring 382 confined between split back up rings 383.

The bore of the liner sleeve 354 is enlarged along a lower portion 384 providing an upwardly facing internal shoulder 385 which supports a split spring retailer 390. A helical piston spring 391 disposed around the head 343 within the linear sleeve is confined between the retainer ring 390 and a downwardly facing annular shoulder surface 392 on the piston 344. The spring biases the piston upwardly toward the retainer 355. Upward movement of the piston is limited by engagement of the upper end surface 393 of the piston with a downwardly facing shoulder surface 394 on the retainer.

Ring seals 395 disposed in internal annular recesses within the body 345 seal between the inner surface of the body and the external surface of the linear sleeve 354. A lock wire 400 disposed in aligned recesses within the sleeve 354 and on the retainer 355 interlocks the sleeve and the retainer.

The retainer 355 has a reduced lower end portion forming a downwardly extending annular flange or lip 401 which is telescopically received within the bore of the upper piston portion 365 when the piston is at an upper position within the cylinder.

The retainer 355 has a lower bore portion 403 which is larger than the reduced upper portion 343a of the head 343 and is divided into substantially equal portions by an internal annular flange 403a. Identical upper and lower annular packings 404 are supported in the bore 403 above and below the flange 403a. Each packing 404 is retained between the flange 403a and a split lock ring 404a having an outer peripheral portion engaged in an internal annular recess in the retainer 355 around its bore portion 403. The retainer has an enlarged upper bore portion 405 for receiving a stop nut 410 threaded on the upper end portion of the head 343 and secured thereto by a set screw 411. The stop nut engages an internal downwardly and inwardly sloping shoulder 412 at the lower end of the retainer bore portion 405 limiting the downward stroke of the piston 344 and head 343. Ring seal 413 disposed in internal annular recesses within the body 345 seal between the retainer 355 and the body. The retainer is held within the body with the liner sleeve 354 by a plurality of radial lock bolts 414 threaded along an inward head portion 415 into a radial bore 420 in an upper flange 421 of the body 345. The heads of the lock bolts each have conical inward end surfaces 422 each of which engages an upper outer beveled surface 423 on the retainer 355. A packing 424 in the bore 420 around each of the lock nuts 414 is held in position by a gland nut 425 threaded into the bore 420.

The fluid conduit 45 is connected into a threaded port 431 in the body 345. The port 431 communicates with an enlarged bore portion 432 of the body 345 defining an annular chamber 433 around a portion of the retainer 355 and an upper end portion of the liner sleeve 354. The chamber 433 communicates with a plurality of fluid ports 434 through the liner sleeve into an annular cylinder chamber 435 defined between the head 343 on the inside, the liner sleeve 354 on the outside, the piston assembly 344 at the lower end, and the retainer 355 at the upper end. The cylinder chamber receives fluid under pressure introduced through the line 45 to force the piston assembly downwardly for opening the subsurface safety valve with its operator tube assembly 23. Control fluid pressure within the chamber 435 applies a downward force to the piston over an effective annular area defined between the line of sealing engagement of the seal assemblies 404 with the outer surface of the head 343 and the line of sealing engagement of the seal assembly 370 on the piston with the liner sleeve bore surface 371. The pressure of well fluids in the flow T 34 around the operator tube is transmitted upwardly into the sleeve 354 applying an effective upward force to the annular piston over downwardly facing surfaces of the piston equal in area to its upwardly facing surfaces exposed to the pressure within the chamber 435. The piston is also biased upwardly by the spring 391 and the spring 144 in the safety valve.

The upper flange 421 of the body 345 supports the valve 41 which is secured to the body by a plurality of bolts 421a. A recess 442 in the flange 421 receives a ring seal 442a to seal between the body 345 and the valve 41. The conduit 42 is connected into the valve 41 for flow into and receiving flow from the tubing string 31 through the safety valve 22 and operator assembly 23. Various suitable well servicing equipment may be supported on the valve 41, such as a stuffing box and wire line servicing equipment employed in installing and removing the tubing safety valve 174 with its lock mandrel 163 and in conducting certain well servicing operations through the piston and operator tube assemblies. Also, a lubricator, not shown, is supportable on the valve 41 for installing and removing the safety valve while the well is under pressure. Such equipment is well known and generally includes spaced valves in a conductor for providing a pressure holding chamber through which the safety valve is loaded into the casing.

The control fluid introduced into the piston assembly through the line 45 may be supplied from the fluid pressure unit 44 which may comprise an Otis Surface Control Manifold illustrated and described at page 3845 of the 1966–67 edition of the Composite Catalogue of Oil Field Equipment and Services, published by World Oil, Houston, Tex. The manifold unit supplies hydraulic fluid to the piston assembly at a predetermined pressure level. The manifold unit may be coupled with other suitable components, not shown, for monitoring any one or several physical conditions responsive to which closure of the safety valve is desired. For example, if stoppage of flow from the well is desired responsive to a surface fire in the vicinity of the well head equipment the manifold unit is coupled with a suitable temperature sensing means adapted to actuate the manifold unit to reduce the hydraulic pressure supplied by it to the piston assembly so that when a fire occurs the pressure within the piston assembly is reduced to allow the safety valve to move upwardly to its closed position. Another condition which may be sensed is increase of flow through the condit 30. Any suitable means for measuring flow rate may be included in the conduit and connected with the unit 44 to release or reduce the control fluid pressure allowing the safety valve to close when a predetermined flow rate increase is reached. Such a rate increase is generally determined as representing quantitatively a value indicating a leak in the conduit 35 or related flow systems.

If desired, depending upon operating conditions, the control fluid may be sealed in the piston assembly under adequate pressure to hold the safety valve open as by substitution of a suitable plug on the conduit 45 for the unit 44. Such a modified system may respond to a physical blow rupturing the conduit 45 and releasing the control fluid pressure allowing the safety valve to move to closed position.

Figure 1:
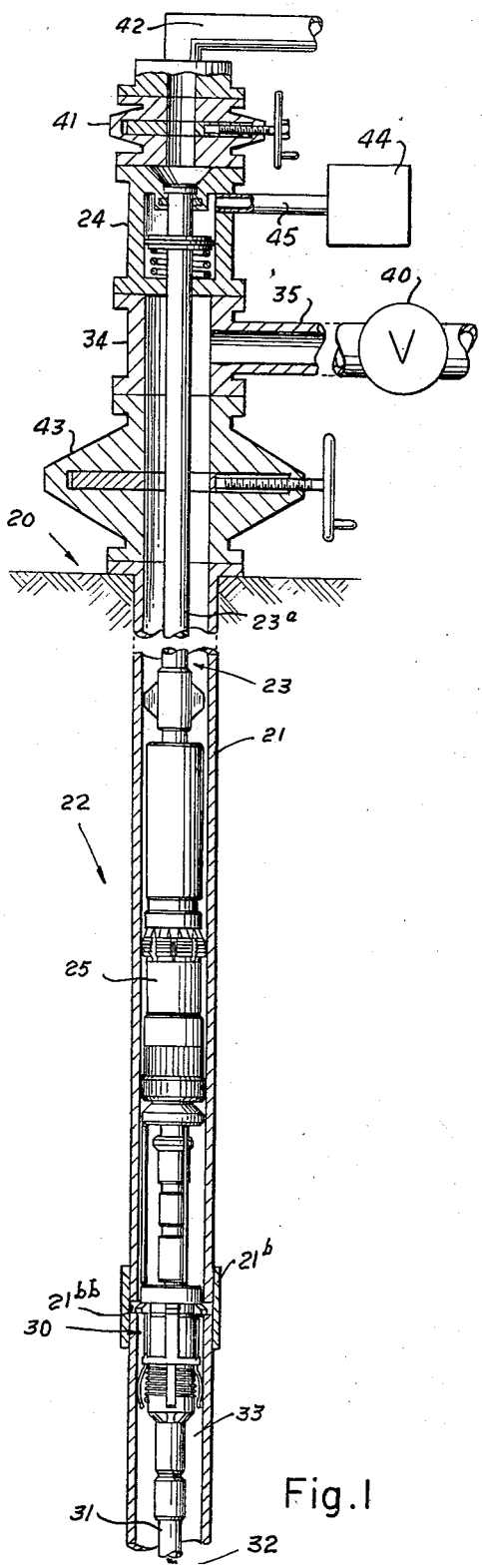

A well in which the subsurface safety valve 22 is to be installed is first equipped by suitable conventional procedures with a well casing comprising casing sections 21a interconnected by couplings 21b as illustrated in FIGURES 1 and 4–4C. At the surface the master valve 43 is secured on the casing for closing off flow in the casing at desired times during the servicing of the well. After installation of the master valve a suitable lubricator is installed on the master valve for use during the installation of the subsurface safety valve in the casing and is subsequently removed, as discussed hereinafter, after the valve installation is completed.

The tubing string 31 is run into the well in accordance with standard procedures. The handling tool 270 is coupled to the hanger unit 30 which is threaded into the upper end of the top tubing string section. The mandrel 290 and the head member 294 of the handling tool are secured together by the shear pin 311. The handling tool is inserted into the body 221 unit the collect finger bosses 321 move into the locking recess 230 and are aligned with the locking ring 323. In introducing the handling tool into the hanger unit body the lower outer cam surfaces on the outer bosses of the collet fingers engage the beveled upper end surface 225 of the body holding the collet 312 against movement as the collet retainer 295 and the sleeve 313 are pushed toward the body. The upper end surface 315a of the collet ring 315 engages the lower end surface 294a of the head 294, at which position the inner surfaces of the bosses 321 of the collet fingers are out of alignment with the lock ring 323 so that the collet fingers are cammed inwardly by the surface 225. The handling tool is telescoped into the body until the lower end edge of the sleeve 313 engages the upper end surface 225 of the body. The collet finger bosses are forced into the body and are aligned with the locking recess 230. The collet fingers expand outwardly into the locking recess to their normal position allowing the collet to return to a position aligning its bosses with the lock ring 323, at which position the outer surface of the lock ring engages the inner surfaces of the inner collet finger bosses 321 holding the bosses expanded in the locking recess. The handling tool is not removable from the body of the hanger unit without shearing the pins 311, as explained hereinafter. The lock pin 303 is held at its inward position by the inner surface of the bore of the head member 294.

With the tubing string supported from the hanger unit 30 which is coupled with the handling tool 270, the handling tool is connected to a suitable conventional wireline or tubing string for lowering the hanger unit into the casing to the desired depth. The collet 234 of the hanger unit is adjusted on its body portion 222 so that the collet finger heads 242 are retracted along the outer surface 233 below the cam surface 232. At this position of the collet the guide pins 260 are each at an upper end location 260a of their respective vertical slot portions 261a, FIGURE 6. The outside diameter of the upper large portion of the hanger unit body portion 222 is slightly less than the inside diameter of the casing so that the hanger unit moves freely through the casing when its locking collet fingers are retracted, and the collet is movable to an expanded locked position only at casing couplings providing internal locking recesses such as the recess 21bb.

The springs 254 are inherently sprung outwardly sufficiently to drag along the inside wall surface of the casing providing substantial friction between the springs and the casing. Since the locking collet is movable longitudinally and rotatably on the hanger unit body, the friction between the springs 254 and the casing wall tends to bias the collet upwardly so that the guide pins 260 each remains at its upper position 260a in its guide recess portion 261a and are not rotated by the spring 244. The hanger unit is lowered until it is at a desired depth, which may be no greater than about 200 feet. A substantially accurate determination of the depth of the hanger unit is obtained by measuring the wire line or tubing fed into the well as the unit is lowered. When the hanger unit is in the vicinity of the coupling 21a at which it is to be locked, and is preferably above the coupling, the unit is lifted upwardly a short distance to release the collet for expansion. The resistance provided by the dragging of the springs 254 along the casing wall holds the locking collet against upward movement as the hanger unit is lifted so that the guide pins 260 are moved downwardly in the guide recess portions 261a to the location at which the guide pins are each aligned with the lower end of the sloping recess portion 261c. The torsion spring 244 rotates the locking collet clockwise as viewed from below with the guide pins each moving into the inclined recess portion 261c. As the locking collet is rotated, its guide pins follow the upwardly sloping recess portions 261c lifting the collet on the hanger unit body so that the heads 242 of the collet fingers are forced upwardly and outwardly along the cam surface 232 until the outer surface or bosses of the collet fingers engage the inner wall surface of the casing thereby limiting further expansion of the bosses along the cam surface and rotation of the collet on the hanger unit body. The hanger unit is then lowered to align the collet bosses with the recess 21bb so that the spring 244 further rotates the collet on the hanger unit body and the guide pins in the sloping recess portions 261c guide the collet further upwardly. The locking collet bosses 244 are thus cammed outwardly by the surface 232 until the bosses are disposed within the recess. The collet bosses move above the cam surface along the locking surface 231 until the upper ends of the collet fingers engage the shoulder 235 on the hanger unit body. At such position the collet finger bosses are fully expanded and disposed within the locking recess 21bb while the guide pins 260 are each at the upper end of its slanted recess portion 261c. The shoulder portions 243 on the collet finger bosses engage the upper end surface of the lower casing section connected into the coupling 21a so that the hanger unit is supported by engagement of its shoulder surface 235 with the upper end faces of the collet finger bosses 242. The engagement of the shoulder surface 243 of the collet bosses with the upper edge surface of the lower casing section at the coupling may occur as the hanger unit moves downwardly and before full expansion of the collet. Such engagement by the collet heads assists in forcing the collet upwardly to its fully expanded position. It will be obvious also that so long as the guide pins are in the sloping portions 261c of the recesses 261 the rotational force of the spring 244 biases the collet toward its locked position on the hanger unit body, so long as the collet heads are free to move outwardly as when they are within the coupling recess 21b. The weight of the hanger unit body and tubing string 31 provides a downward force on the body relative to the locking collet which also forces the collet guide pins upwardly in their guide recesses biasing the collet to its maximum expanded position. Thus, with the locking collet bosses expanded into the casing coupling recess 21bb and so long as the hanger unit body is not lifted upwardly, the collet remains expanded to support the hanger unit at the coupling. If the hanger unit is initially lifted to release the locking collet below the coupling 21a due to an error in ascertaining the depth of the unit, the unit is lifted above the coupling and then lowered to allow the collet to move to expanded position with its bosses disposed in the coupling recess 21bb, as discussed above. As the hanger unit is lifted upwardly through the coupling the collet finger heads expand into the recess 21bb. The heads engage the lower end of the upper casing section connected into the coupling. As the hanger unit continues upwardly the collet is held against upward movement as the cam surface 232 is moved upwardly so that the collet fingers may be forced inwardly sufficiently to allow the hanger unit to be lifted above the coupling. The hanger unit is then lowered as previously discussed to allow the locking collet bosses to expand into the coupling recess. The relative downward and inward movement of the collet as the hanger unit is lifted through the coupling does not move the collet back to its initial locked position on the body. The guide pins are not forced downwardly to the bottom of the inclined recess portion 261c. Also the short horizontal connecting recess between the vertical and sloping recess portion generally prevents return of the guide pins to the vertical locking positions of the guide pin recesses.

With the hanger unit locked in the casing at the coupling 21, the handling tool 270 is disengaged from the hanger unit by applying a sufficient downward force on the mandrel 290 to shear the pin 311, releasing the mandrel for downward movement in the head 294 until its annular flange 300 engages the upper end face of the head and the locking pin 302 is aligned with the recess 310. The locking pin is forced outwardly by the spring 305 with its reduced head portion 303 entering the locking recess 310 in the head 294. The downward movement of the mandrel shifts the lock ring 323 from its locking position to a position below the collet finger bosses 321. The mandrel 290 is lifted, raising the sleeves 313 and 314 since the mandrel is coupled to the head 294 by the pin 302. The sleeve 314 lifts the collet 312 until the upper end surfaces of the collet finger bosses 321 engage the upper end surface of the locking recess 230 in the hanger unit body camming the fingers inwardly around the running tool sleeve 314 above its lock ring 323 so that the collet finger bosses move out of the locking recess releasing the handling tool from the hanger unit. The handling tool and tool string are withdrawn from the casing through the master valve and lubricator by conventional procedure.

At the surface the severed portions of the shear pins 311 are removed and a new pin is inserted to relock the mandrel 290 and head 294 of the handling tool in their running positions. The handling tool is then coupled with the sleeve 114 of the packer unit. As the handling tool is inserted into the sleeve its collet finger heads 221 engage the upper end surface of the sleeve forcing the collet upwardly on the sleeve 314 within the sleeve 313 until the collet bosses 321 are above the locking ring 323. The collet finger bosses are cammed inwardly around the sleeve 314 sufficiently for them to be inserted into the sleeve 114 until they are aligned with and spring outwardly into the locking recess 125. The handling tool is lifted raising the locking ring 323 within and aligning it with the collet finger bosses 321 to hold them outwardly in the locking recess so that the handling tool is coupled with the packer unit.

The handling tool is connected with suitable structure such as a wireline tool string and the packer unit with its slip assembly 53 fully retracted, FIGURES 2–A and 2–B, is lowered through the well casing until the lower ends of the spacer rods 134 engage the upper end surface 225 of the hanger unit body, supporting the packer unit against further downward movement in the well casing, FIGURES 4–A through 4–C. The lower extension tube 173 telescopes into the hanger unit body with the seal head 185 entering the bore 223a of the lower reduced portion of the hanger unit body, the packing 193 sealing with the wall of the bore. As the packer unit is lowered through the casing, the outside surface 60 of the seal assembly 54 slides along the inner wall surface of the casing.

With the packer unit supported by the spacer rods on the hanger unit, a downward force is applied to the mandrel 290 of the handling tool forcing the lower end surface of the handling tool outer sleeve 313 against the upper end surface of the packer unit sleeve 114. The downward force on the sleeve 114 is resisted by the shear pins 124 which couple the sleeve 114 with the retainer ring 123. The retainer ring 123, of course, is connected on the mandrel 50 which is secured by the coupling 52 to the lower mandrel 51. The lower mandrel is held against downward movement by the spacer rods 134 engaging the upper end of the hanger unit body so that the downward force applied to sleeve 114 is resisted by the ring 123 tending to shear the pins 124. When the downward force on the sleeve 114 exceeds the resistance of the pins 124, the pins are sheared releasing the sleeve 114 which is forced downwardly over the ring 123 moving the wedge and slip release sleeve 93 downwardly on the mandrel 50 toward the expander 94. The slips 72 are forced downwardly since the carrier 74 is secured to the sleeve 93 by the shear pin 75 so that a lower end portion of the sleeve 93 along its tapered expander surface 110 moves into the expander 95 while the inner slip surfaces 112 slide along the outer surfaces 102 of the expander fingers. The slips are expanded until their toothed portions 113 are wedged sufficiently tightly between the expander fingers 95 and the inner wall surface of the casing to resist further downward movement. Since the sleeve 73 moves into the expander simultaneously with the downward movement of the slips along the outside of the expander the expander fingers are held against inward movement as the slips are wedged between them and the casing wall surface. The wedging action of the slips provides sufficient resistance to the downward movemnet of the slip carrier 74 so that the shear pins 75 are sheared releasing the sleeve 73 to move downwardly relative to the slip carrier 74, the slips, and the expander 94. The further downward movement of the sleeve 73 behind the expander fingers after the pins 75 are sheared forces the fingers radially outwardly due to the camming action of the wdege sleeve surface 110 with the inner expander finger surfaces 101 forcing the slips into tighter engagement with the inner wall surface of the casing. The additional downward movement of the wedge sleeve after severance of the shear pins 75 is evident in FIGURE 4–A from the relationship shown between the upwardly facing shoulder 92 on the sleeve 73 and the inner flanges 91 of the slips. It will also be noted that the shear pin 75 is now severed into an inner portion 75a which has moved downwardly with the sleeve 73 and an outer portion 75b remaining in the slip carrier 74. Similarly, the downward movement of the setting sleeve 114 relative to the upper mandrel and the ring 123 is evident from the longitudinal spacing of the shear pin segments 124a and 124b and the spaced relationship of the shoulder surfaces 121 and 122 in the sleeve 114 and the lower end of the ring 123, respectively. The hanger unit collet supports the subsurface safety valve against downward movement while the slip assembly 53 supports the valve against upward movement in the casing.

The downward jarring of the packer unit and the handling tool is continued for releasing the handling tool from the packer unit. The sleeve 114, which is held against downward movement by the slip assembly 53, supports the outer sleeve 313 and the head member 294 of the handling tool and the pin 311 is sheared releasing the mandrel 290 of the handling tool to move downwardly relative to the head member 294 until the flange 300 engages the upper end surface of the head member 294 and the lock pin 302 is forced outwardly by its spring into the blind recess 310 thereby locking the handling tool mandrel and its head member and sleeve at their release positions, as discussed above. The handling tool string is then lifted upwardly to uncouple the handling tool and withdraw it from the packer unit. The handling tool and tool string are then withdrawn from the casing through the master valve and the lubricator by conventional procedures. During the lowering of the packer unit through the well casing, coupling it into operative relationship with the hanger unit, and activating the packer unit clips, the valve 153 is biased to an upper position at which its head 154 engages the mandrel seat surface 133 by the force of the spring 144 acting on the guide and support ring 145 lifting the tube 141 relative to the mandrel. As the packer unit is lowered in the casing, fluid present within the casing passes through the lower tube 173 and the operator tube 141, since the tubing safety valve 174 is either not within the lower tube or if in the tube it is open. Since the tubing safety valve 174 remains open at all times other than when there is flow through it above a predetermined rate the valve may be installed in the packer unit lower tube either at the surface or after the packer unit is locked at operating position in the well casing. It is generally preferred that the safety valve 174 supported on its locking mandrel 163 be installed by conventional wire line procedures after the packer unit has been locked at its operating position on the hanger unit in the well casing. The safety valve and the locking mandrel are inserted into the packer unit with the dogs 170 of the locking mandrel being expanded into the locking recess 161 of the landing nipple 160 supporting the safety valve 174 in the central flow passage in the lower tube 173 of the packer unit.

If the tubing safety valve 174 is installed when the hanger unit is at its downhole operating position, one form of tool string which may be employed for its installation is a set of Otis line wire tools as illustrated at page 3929 and a Type T Otis running tool illustrated at page 3931 of the 1962–63 edition, Composite Catalogue of Oil Field Equipment and Services, supra.

The next step in the installation procedure is the insertion of the operator tube assembly 23 to provide means for moving the annulus valve 153 to and holding it at its open position from the surface. The distance is determined between the upper end of the tube 141 of the packer unit and the required location of the upper end of the head member 343 of the piston assembly 24 when the assembly is set in place on the well head. This distance is best measured by assembly of the guide head 203 on the lower end of the tube 204 and lowering the tube through the master flow valve into the casing until the seal and guide head are seated on the upper end of the tube 141. The tube 204 is marked and threaded for connection of the head 343. Consideration is given to the fact that the annulus valve 153 is at its closed position so that when the piston assembly is initially installed on the well head without the control fluid in the piston unit its head member is at an upper end position. Also, preferably the tube 204 is cut slightly short so that upon initial installation the guide head 203 is spaced slightly above the upper end of the tube 141 so that the safety valve is not inadvertently opened upon initial seating of the operator assembly. The full stroke of the piston 344 is in excess of the distance between the open and closed positions of the annulus valve 153 of the subsurface safety valve.

The operating tube assembly 23 is lowered through the flow T 34 and the master valve into the casing and supported with a small portion of the tube 204 extending above the flow T to permit connection of the head member 343 of the piston assembly. The piston assembly is then supported above the flow T while the connection is made between the upper end of the tube 23a and the lower threaded end portion of the head member 343. The piston assembly is lowered into position on the flow T to which it is secured by bolts, not shown, through the bolt holes 345 in the lower spool flange 345b of the piston assembly body. The lowering and securing of the piston assembly on the flow T is carefully done to insure that the guide head 203 is directed into the sleeve 114 of the packer unit over the tube 141 to its seated position thereon. The piston assembly is, of course, supported above the flow T while the connection is made between the upper end of the tube 204 and the lower threaded end of the head member 343. The piston assembly is then lowered. While the guide head 203 need not, upon initial installation of the operator tube assembly and piston, actually engage the upper end of the tube 141 it must be sufficiently close to a seated position thereon that when the piston assembly is actuated for moving the tube 204 downwardly the tube 141 is shifted downwardly to move the annulus valve 153 to its open position.

After the piston assembly is positioned and secured on the flow T, the valve 41 and the line 42 are connected on the well head as shown in FIGURE 1. The required connections are made with the control line 45 and the fluid pressure unit 44. If desired, the unit 44 is interconnected with detector means, not shown, which monitors one or more physical conditions responsive to which it is desired that the piston unit function to close the annulus valve 153. For example, if it is desired that the safety valve close in response to a flow rate in excess of a predetermined value, the means for monitoring the flow rate are innerconnected with the pressure unit 44 so that a rupture in the line 35 which allows a sudden increase in flow rate through the line in excess of a predetermined value causes the pressure unit 44 to relieve the pressure in the piston unit 24 to allow the valve 153 to close. Obviously, other monitoring systems may include temperature sensing means, shock responsive means reactive to sudden physical blows which might severely damage or destroy the surface equipment, wind velocity measuring means, and means for measuring other conditions which may signal the desirability of shutting off flow from the well into the line 35.

When the necessary surface connections are completed for supplying control fluid to the piston unit 24, the annulus valve 153 is opened by fluid pressure supplied from the unit 44 through the line 45 into the piston unit. The pressure is transmitted into the body 345 and downwardly within the body and the annular flow passage 433 around the liner sleeve 354 to the ports 434. The fluid pressure is communicated inwardly through the ports 434 into the annular cylinder chamber 435 to the upwardly facing surfaces of the piston assembly 344 over an effective area defined between the line of sealing of the packings 403 and 404 with the outer surface of the head member 343 on the inside and the line of sealing of the packing 370 with the inner wall surface of the liner sleeve 354 on the outside. The force of the control fluid pressure on the piston assembly biases the head member 343 and the operator tube assembly downwardly. When the downward force on the piston assembly exceeds the combined resistances of the spring 391 of the piston assembly and the spring 144 around the tube 141, along with the upward force of well pressure on the annulus valve 153 acting over an effective area defined between the line of sealing of the head 154 with the seat surface 133, the valve rod 141 is forced downwardly to open the annulus valve. The tube 141 is forced downwardly by the operator tube assembly by virtue of the engagement of the guide head 203 with the upper end of the tube. The annulus valve is moved to its lower open position by what may be referred to as "snap action" since the force of the well pressure on the annulus valve rapidly diminishes when the seal is broken between the head 154 and the seat surface 133 so that the control fluid pressure necessary to break the seal ceases to be opposed by well pressure momentarily after the seal is broken and thus the substantial control fluid pressure acting against the springs 144 and 291 rapidly moves the valve downwardly to its open position.

The well system 20, FIGURE 1, includes an annular flow passages 33 within the casing around the tubing string and operator tube and the tubing flow passage 32 through the tubing string and operator tube. Upward flow in the annular flow passage is controlled by the annular valve 153 and upward flow in the tubing flow passage is controlled by the tubing safety valve 174. The fluid in the annular passage 33 flows upwardly into the ports 263 at the lower end of the hanger unit body. The fluid flows in the hanger unit body around the tube 173, returning to the casing through the open upper end of the hanger unit around the landing nipple 160. The fluids flow upwardly within the casing around the landing nipple past the open valve 153 into the lower end of the annular flow passage 143 through the packer unit mandrel around the tube 141. The fluid flows upwardly within the passage 143 exiting from the packer unit through the open upper end of the sleeve 114. The fluid then flows upwardly in the well casing around the operator tube into the well head from which it exits from the well through the T 34 and the flow line 35.

Fluid flow in the passage 32 of the tubing 31 passes upwardly into the lower end of the hanger unit body entering the lower open end of the lower tube 173 of the packer unit through the seal head 185, flowing upwardly in the tube through the tubing safety valve 174 and its locking mandrel 163. The fluid flows into the open lower end of the tube 141, through its central flow passage 142 upwardly into the tube 204 of the operator assembly 23 and to the conduit 42. The well may be produced through both of the annulus flow passage and the tubing flow passage, though it is preferred that production be through the annulus with the tubing string 31 being reserved for such purposes as pumping liquid into the well for shutting in or "killing" the well.

When the control fluid pressure applied from the unit 44 through the conduit 45 into the piston unit is reduced below the value required to hold the annulus valve of the safety valve 22 open, the forces of the springs 391 and 144 together with well pressure acting on the valve component including the valve 153 lift the operator assembly 23 upwardly against the downward force holding the valve open. The valve 153 is moved to its closed position by the spring 144 and the force of the pressure drop within the well fluids flowing through the valve. If the spring force and fluid flow pressure drop conditions are such that the valve stem and valve member tend to move up more rapidly than the operator tube assembly and the piston, the valve tube 141 may contribute somewhat to lifting the operator tube assembly and the piston. In any event, the tube 141, the valve member 153, the landing nipple 160, the lower tube 173, and the tubing safety valve 174 with its locking mandrel 163 are raised by the spring 144 and the force of the pressure drop of the well fluids flowing through the annulus valve. As soon as the valve member 153 is moved sufficiently close to the seat surface 133, the restriction between the valve member head 154 and the seat surface creates a pressure differential in the fluids flowing between the surfaces to apply an upward force on the valve member which snaps the valve fully closed. The valve is held closed by the upward force of the spring 144 acting on the ring retainer 145 together with the upward force of well pressure acting on the valve member 153. The valve remains closed until the control fluid pressure within the piston unit 24 is again raised to a sufficient level to force the operator tube 23 back downwardly, as discussed above, to reopen the valve against the force of the pressure of the well fluids and the springs 144 and 391.

At the time the annulus valve closes, as discussed above, if the well is not being produced through the tubing it will be completely shut-in by virtue of the closure of the annulus valve. If, on the other hand, there is production through the tubing, its flow rate generally increases to a level sufficient to effect the closing of the tubing safety valve 174. The tubing safety valve then remains closed so long as a predetermined pressure differential is applied across its ball valve member. Generally, the shut-in well pressure is sufficient to maintain the valve at tis closed position so that it is reopened by either pumping fluid downwardly from the surface through the operator tube assembly tube 203 and the tube 141 into the safety valve to equalize the fluid pressures across its ball member so that its spring 180 returns it to the open position, or, alternatively, the valve is reopened by a suitable wire line tool.

As the lower tube 173 of the packer unit is raised and lowered during the closing and opening of the annulus valve 153, the seal head 185 on the lower end of the tube slides within the bore of the lower body portion 223 of the hanger unit while maintaining a sealed relationship between its packing 193 and the inner wall surface 223a of the hanger unit lower body portion 223 to maintain separation of the annulus and the tubing flow passages irrespective of whether the annulus valve is closed or open.

The tubing string 31 fulfills two basic functions relating to the production and servicing of a well. Primarily the tubing string directs liquid to the bottom of the well when it is necessary to "kill the well" by pumping in a quantity of liquid to provide sufficient hydrostatic pressure to prevent formation fluids from flowing upwardly in the well. This generally must be done through tubing having an outlet substantially at the bottom of the well as it cannot be satisfactorily accomplished by introducing liquid into the annulus at the surface end of a well. Thus, liquid is pumped through the conduit 42 and downwardly in the tube 204 into the tube 141. The liquid flows through the tubing safety valve and its locking mandrel into the tubing string 31. The liquid flows into the well bore through the lower open end of the tubing string. Such liquid is pumped into the well bore until its level provides hydrostatic pressure on the producing formations opening into the well bore in excess of the formation pressure so that the formation fluids are incapable of displacing the injected liquid and thus the well ceases to flow.

Another basic function of the tubing string 31 is the production of or removal of water which frequently collects within the well bore and which is not readily removable through the substantially larger annulus flow passage 33. The water is produced upwardly through the tubing string and the subsurface safety valve into the tube 204 from which the water flows through the piston unit and exits from the well head through the conduit 42. Such water removal may be carried out simultaneously with production of well fluids from the annular flow passage 33 through the valve 153.

A particular application of the subsurface safety valve 22 is in wells generally referred to as "storage wells" leading to subterranean formations used to store natural gas which is withdrawn for distribution during periods of high consumption The substantial cross sectional area of the annulus passage of the valve 22 allows flow of large volumes of stored gas to the surface from formations penetrated by the well in which the valve is positioned. While the valve 22 may be used to produce from both the casing annulus and the tubing string, it is generally preferred that the production be through the annular flow passage of the valve while the tubing string 31 is reserved for producing collected water from the well and for "killing the well," if necessary.

Well surveys are conducted in a well below the safety valve by inserting and removing tools through the valve while it remains in operating position in the well. After closing the valve 41 the conduit 42 connected into the valve is disconnected and suitable equipment is mounted on the well head for handling well survey tools which are inserted under pressure into the tube 204 and downwardly through the tubing 141 of the valve 22 and the tubing safety valve into the tubing string 31. Of course, if the tools will not pass through the tubing safety valve it is removed utilizing suitable standard wire line procedures and then is reinstalled subsequent to completion of the well survey. After completing such a survey the wireline well head equipment is removed and the conduit 42 is reconnected to the valve 41.

The subsurface safety valve 22 is removable from the well casing utilizing the same equipment previously employed for its installation. The safety valve and the related apparatus including the operator tube assembly 23 along with the tubing string supported from the hanger unit is removed either with the well under pressure or after the well is "killed" by pumping liquid into it through the tubing string, as previously discussed.

When the safety valve 22 is to be removed with the well under pressure the valve is first closed to allow for the removal of the operator tube assembly 23 which must be withdrawn from the casing before the safety valve may be released. The pressure source 44 is actuated to reduce the pressure within the piston unit 24 sufficiently for the annulus valve to move to its closed position, as discussed above. Also, the valve 41 is opened allowing fluid to flow from the tubing string at a rate sufficient to effect the closing of the tubing safety valve 174 in the tube 173. When the annulus and safety tubing valves are both closed, the pressure within the casing above the subsurface safety valve 22 is bled down to atmospheric through the lines 35 and 42. The necessary well head components are removed to allow the operator assembly 23 to be disengaged from the safety valve and withdrawn from the well. The screws 414 are retracted releasing the piston assembly 344 from its body 345 and a suitable pulling tool is threaded into the upper end of the head member 343, and the piston assembly along with the operating tube assembly is lifted from the well. The piston assembly raises the retainer 355 and the liner sleeve 354 is lifted due to the lock wire 300 so that the entire assemblage in the spool body is removed. A wireline tool string lubricator is installed on the well head for the purpose of removing the tubing safety valve 174. The pressure is equalized in the well across the subsurface safety valve by either the use of an equalizing prong on a pulling tool or pumping fluid into the well casing above the safety valve to equalize the pressure across the tubing safety valve allowing it to return to its open position. The lock mandrel 163 is then engaged by a suitable pulling tool and the mandrel together with the tubing safety valve 174 are lifted from the landing nipple 160 in the packer unit into the lubricator. The master valve 43 is closed while a large lubricator capable of accommodating the packer unit 25 and the tubing hanger unit 30 is installed on the well head.

The packer unit 25 is then released and withdrawn from the well with the handling tool 270. The handling tool is lowered on a wireline or a tubing string inserted through the lubricator downwardly through the body of the piston assembly and the master valve into the casing to the sleeve 114 of the packer unit. The lower outer surfaces of the bosses 321 of the handling tool collet fingers engage the upper end surface of the sleeve 114 holding the collet against downward movement while the remainder of the handling tool moves downwardly relative to its collet. The mandrel 290 and the sleeve 314 along with the lock ring 323 move downwardly within the collet so that the lock ring moves below the collet finger bosses. The collet fingers are cammed inwardly by the upper end surface of the sleeve 114 allowing the handling tool to move downwardly into the sleeve until the lower end surface 313a of the sleeve 313 engages the upper end sleeve surface of the sleeve 114. When the collet finger bosses 321 are aligned with the locking recess 125 within the sleeve 114 the collets spring the bosses outwardly into the recess. The handling tool is then lifted with its collet being held against upward movement by engagement of its bosses 321 in the locking recess while the other components of the handling tool move upwardly lifting the lock ring 323 to a position within the collet bosses holding them at their normal expanded positions and prevent their being cammed inwardly out of the recess 125.

With the handling tool coupled into the packer unit of the subsurface safety valve the handling tool is lifted, raising the sleeve 114 upwardly and lifting the wedge and slip release sleeve 73 thereby withdrawing its wedge surface 110 from within the expander fingers 95. As the sleeve 73 moves upwardly its external annular flange shoulder 92 engages the internal shoulder surface 91 within the head end of each of the slips 72, pulling the slips upwardly along the upwardly and inwardly tapered expander finger surfaces 102 and withdrawing the slips from their wedged position between the inner wall surface of the casing and the expander fingers. Subsequent to the release of the slips the sleeve 114 is lifted farther upwardly by the handling tool until the shoulder surface 121 on the flange 115 of the sleeve 114 engages the lower end surface 122 on the retainer nut 123. The nut 123 being secured to the upper end of the packer unit mandrel lifts the remainder of the mandrel in the packer unit, including its upper mandrel portion 50, the coupling member 52, and the lower mandrel portion 51. The seal assembly 54 is dragged along the inner wall surface of the casing. Also lifted upwardly by the nut 123 is the tube 141, which lifts the annulus valve 153, the landing nipple 160, and the lower tube 173, along with the packing head 185 which is withdrawn from the lower body portion 223 of the hanger unit as the complete packer unit is lifted by the handling tool. The packer unit is lifted into the lubricator and removed in a conventional manner. The master valve 43 is then closed until reinstallation of the safety valve is desired.

After removal of the packer unit the handling tool 270 is again inserted into the casing for removing the hanger unit 30 which of course, remained at its locked position in the well supporting the tubing 31 when the packer unit was removed. The handling tool is lowered into the coupled relationship with the hanger unit body in the same manner as described above in connection with the coupling of the handling tool into the packer unit sleeve 114. When coupled with the hanger unit the collet bosses of the handling tool are disposed within the locking recess 230 of the hanger unit body. The handling tool and hanger unit which is supporting the tubing string 31 are lifted upwardly. As the hanger unit moves upwardly the bosses 242 of its locking collet 234, engage the lower end edge surface of the upper casing section connected into the coupling 21a, holding the locking collet against upward movement as the hanger unit is lifted. The cam surface 232 on the body portion 222 moves above the locking collet bosses 242 and the inherent inward springing of the collet fingers contracts the collet heads inwardly around the reduced diameter portion 233 of the hanger unit body. The locking collet remains retracted unless the direction of movement of the hanger unit is reversed and the unit is lowered to a casing coupling recess which, of course, would return the collet to an expanded locking position. Also, as the hanger unit is lifted in the casing the drag of the springs 254 along the inner wall of the casing continually tends to pull the locking collet downwardly relative to the hanger unit body while the collet guide pins 260 each within its sloping recess portion 261c revolves the collet on the hanger unit body in a counterclockwise direction as viewed from below the unit. As previously mentioned, while the collet on the hanger unit will generally move downwardly on the unit to a position at which its guide pins are each located substantially at the lower end of the inclined recess portion 261c, the collet is not returned to its initial locked position in which its guide pins are in the vertical portions 261a of the guide pin recesses. Thus, the collet remains in released relationship on the hanger unit body so that any reversal downward of the hanger unit tends to expand and therefore reengage the locking collet. Thus, the hanger unit is freely lifted upwardly by the handling tool through one or more casing couplings but the unit once released can not be lowered through a coupling. The hanger unit is lifted into the lubricator on the well head and removed along with the sections of the tubing string 31.

Alternatively and preferably, the subsurface safety valve including both its packer and hanger units and the tubing string 31 are removed from the casing after the well has been "killed" in accordance with previously described procedure. Under such circumstances the subsurface safety valve is not removed from the casing under pressure, and, thus, a lubricator is not employed on the well head. In order to facilitate circulation in the well during the pumping of liquid into it for the purpose of "killing" it the annulus valve 153 is held opened. After the well has been sufficiently filled with liquid to prevent flow from it, the fluid pressure within the piston unit 24 is reduced by the pressure source 44 allowing the annulus valve to close. The operator assembly 23 is removed in accordance with the steps discussed above. After removal of the operator assembly, the packer unit 25 is withdrawn, followed by the hanger unit 30 and the casing string 31 in accordance with the previously described steps. If desired, prior to withdrawal of the hanger unit the tubing safety valve 174 with its lock mandrel is removed by suitable wire line tools, or, alternatively, the tubing safety valve and its lock mandrel are left in the packer unit and removed at the surface. The presence or absence of the tubing safety valve and its lock mandrel within the lower tube 173 of the packer unit does not affect the removability of the unit with the handling tool 270.

It will now be seen that a new and improved device for controlling flow through a flow conductor has been described and illustrated.

It will be further seen that a flow control device embodying the invention is actuatable from the surface.

It will be further seen that well servicing operations are carried out below the device by operating through it without removing it from the well.

It will also be seen that the device includes means for supporting a tubing string within a well bore whereby fluid is circulated in the well in one direction through a tubing flow passage and in the other direction through an annular flow passage.

It will also be seen that the flow control device includes a tubing hanger unit for supporting a tubing string in the well bore and a packer unit, including means for sealing around the control device with the inner wall surface of the well bore and a valve for controlling annulus flow upwardly to the surface.

It will be further seen that the flow control device includes a packer unit comprising a tubular mandrel, an annular seal on the mandrel, an upper locking means on the mandrel for holding the unit against upward movement in a well bore, an annulus valve supported in the mandrel and biased toward a closed position by a spring and adapted to be held at an open position by operator means extending from the surface, and a tubing hanger unit coupled with the packer unit comprising a body having locking means for supporting the hanger unit against downward movement in a well casing and with the packer unit defining tubing and annulus flow passages communicating with the tubing and annulus flow passages of the well below the hanger unit.

It will additionally be seen that a new and improved hanger for supporting tubing in a well bore has been described and illustrated.

An alternate form of a subsurface safety valve 22A embodying the invention is shown in FIGURES 8–A through 8–C. In the valve 22A the tubing safety valve 174 and its lock mandrel 163 are shifted from the lower tube 173 extending into the hanger unit to a position above the sleeve 114 of the packer unit. This relocation of the tubing safety valve provides a substantially enlarged annular flow passage through the hanger unit. Referring specifically to FIGURE 8, the subsurface safety valve 22A includes a packer unit 25A which is a slightly modified form of the packer unit 25 and a hanger unit 30 identical to the hanger unit 30 included in the above described subsurface safety valve 22. Identical components of the packer units 22 and 22a are identified by the same reference numerals. Slightly altered components of the packer unit 22A are denoted by the same reference numerals as the unit 22 plus the addition of a prime (') mark. In FIGURE A, a tube 173' is threaded along an upper end portion into the annulus valve 153. The seal head 185 is secured on a lower end portion of the tube 173' for slidably sealing with the bore wall the lower portion of the hanger unit, as previously discussed. The tube 173' serves the same function as the tube 173 defining a tubing flow passage through the hanger unit for conducting fluid from the tubing string 31 through the annulus valve into the tube 141'. The tube 173' is sufficiently smaller than the tube 173 that a substantially larger annular flow passage is provided through the hanger unit than in the subsurface valve 22.

Spacer rods 134' are secured at their upper ends to the lower end edge of the lower mandrel 51 to support the packer unit on and space it from the hanger unit 30. The rods 134' are identical to the rods 134 except they are shorter since the hanger unit and packer unit need not be spaced as far apart as when the landing nipple for the tubing safety valve is secured in the tube 173 as in the valve 22 above. The rods 134' space and support the packer unit above the hanger unit such that when the annulus valve 153 is at its lower end open position it remains sufficiently above the hanger unit body that it does not tend to restrict the annular flow passage through the body around the tube 173'.

The tube 141' of the packer unit is threaded along an upper end portion above the sleeve 114 but otherwise is identical to the tube 141 of the valve 22. The coupling 172 is secured on the threaded upper end portion of the tube 141'. A landing nipple 160' is threaded into the coupling 172 for receiving the locking mandrel 163 which supports the tubing safety valve 174. A reduced polished upper end portion 160a' is provided on the landing nipple for insertion into the head unit 203 of the operator assembly 23.

In all respects other than the relocation of the tubing safety valve along the upper end portion of the packer unit 25A and the use of a lower tube 173' of reduced diameter, the subsurface safety valve 22A is identical to the valve 22. The valve 22A is installed, removed, and functions in the same manner as the valve 22 described above.

It will now be seen that an alternate form of a subsurface safety valve embodying the invention includes a tubing safety valve releasably secured within an upper end portion of the packer unit of the valves providing a substantially enlarged annular flow passage through the hanger unit of the valve.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A valve device comprising: a mandrel having a longitudinal bore; locking means on said mandrel for releasably locking said device in a well casing; seal means on said mandrel for sealing between said mandrel and said casing; elongate movable means provided with a central longitudinal flow passage disposed in said longitudinal bore of said mandrel and defining with said mandrel separate annular and central flow passages through said bore; valve means on and movable with said movable means for controlling the flow in said annular passage; means biasing said movable means and said valve means toward a position in which said valve means is closed; operator means engageable with said movable means for moving the same to move said valve to an open position; fluid flow responsive valve means supported in fluid flow communication with said central flow passage for controlling flow in said central flow passage; and hanger means having means for releasably supporting it in said casing below said mandrel and having means for supporting a tubing string in said casing in communication with said central flow passage of said movable means.

2. A valve device as defined in claim 1 wherein said hanger means for supporting a tubing string in said casing comprises: a mandrel having means for supporting tubing therefrom; and a collet supported on said mandrel for movement between expanded and retracted positions for releasably supporting said mandrel of said supporting means in said casing.

3. A valve device of the character set forth in claim 1, wherein said hanger means for supporting tubing in a well bore comprises: a mandrel having means for supporting tubing therefrom and external surfaces for holding a locking collet at an expanded locking position on said mandrel; and a collet supported for movement on said mandrel between retracted and expanded positions, said collet having locking heads expansible into locking engagement with said well casing for releasably supporting said mandrel of said hanger means and tubing connected therewith in said well bore.

4. A valve device as defined in claim 3 wherein said mandrel of said hanger means has first external surfaces along which said collet is supported at a retracted position of said locking heads and second locking heads at expanded locking positions, and means for supporting said collet for movement along said mandrel between a positon in which said locking heads are aligned with said first surfaces in retracted position and another position in which said locking heads are aligned with said second surface in expanded locking position.

5. A valve unit of the character set forth in claim 1, wherein said hanger means for supporting tubing within a well casing comprises: a mandrel having a longitudinal flow passage therethrough and provided with means along one end portion for suspending tubing therefrom and means along the other end portion for coupling a running and pulling tool to said hanger mandrel for positioning said hanger means within and removing it from said well casing; a locking collet having locking heads thereon supported on said mandrel of said hanger means for rotational and longitudinal movement thereon between an expanded locked position and a retracted unlocked position; said mandrel of said hanger means having first external annular surfaces along which said collet is disposed at said unlocked retracted position and a second external annular surface coaxial with and having a diameter greater than said first surfaces for holding said locking heads of said collet at said expanded locked position; means operatively associated with said mandrel of said hanger means and said collet for holding said collet at said retracted unlocked position on said mandrel and for guiding said collet to said expanded locked position; and means biasing said collet rotationally on said mandrel of said hanger means to move said collet heads in alignment with said second surface for holding said heads expanded.

6. A valve unit as defined in claim 5 wherein said mandrel of said hanger means is provided with an external cam surface between said first and second surfaces for camming said collet locking heads outwardly to said locked position, and said means for releasably securing said collet at an unlocked position and guiding said collet to said expanded position includes guide pin means on said collet and locking and guide slots on said mandrel of said hanger means receiving end portions of said guide pin means for locking said collet downwardly at a retracted position on said mandrel and for guiding said collet to expanded position along said second surface on said mandrel, drag spring means on said collet engageable with the well casing to effect relative movement between said collet and said mandrel of said hanger means to release said collet from said retracted position on said mandrel, and torsion spring means between collet and said mandrel of said hanger means biasing said collet rotationally and longitudinally on said mandrel for moving said collet from a retracted to an expanded position when said pin means on said collet is released from said locking slot.

7. A valve unit as defined in claim 6 wherein said slots on said mandrel of said hanger means have vertical portions for holding said collet at a retracted position and communicating slanting portions for guiding said collet in a spiral pattern along said mandrel to said unlocked position.

8. A valve device comprising: an upper mandrel having a longitudinal bore; movable means disposed in said bore, said movable means having a central longitudinal flow passage and defining with said mandrel a separate annular flow passage through said bore; valve means on and movable with said movable means for controlling flow in said annular passage; means biasing said movable means and said valve means toward a closed position; operator means engageable with said movable means for moving said movable means and said valve means to a position in which said valve means is held open against said biasing means; valve means releasably secured in said central flow passage for controlling flow therethrough; means on said upper mandrel for locking said mandrel in a well casing; seal means on said upper mandrel for sealing between said mandrel and said casing; a lower mandrel operatively associated with said upper mandrel and having a longitudinal bore therethrough; said movable means extending into said bore of said lower mandrel and with said lower mandrel defining an annular flow passage communicating with said annular flow passage of said upper mandrel; support means on said lower mandrel engageable with said well casing for releasably supporting said mandrel in said well casing; and tubular means on said lower mandrel engageable by said movable means and having means for supporting a tubing string dependent therefrom and communicating with said central flow passage of said movable means.

9. A valve device as defined in claim 8, wherein said lower mandrel is separate from and insertable into and removable from said casing indepdently of said upper mandrel.

10. A valve device as defined in claim 8 wherein said movable means includes a lower tube extending below said upper mandrel in slidable relation into said bore of said lower mandrel providing said central flow passage in said lower mandrel and defining with said lower mandrel said annular flow passage in said mandrel.

11. A valve device as defined in claim 10 wherein said valve means supported in communication with said central flow passage is positioned substantially within said lower mandrel.

12. A valve device as defined in claim 10 wherein said valve means supported in flow communication with said central flow passage is positioned above said upper mandrel.

13. A well tool comprising: a packer unit having a mandrel provided with a longitudinal bore, seal means on said packer unit mandrel for sealing between said mandrel and a well casing, locking means on said packer unit mandrel for locking said mandrel against upward movement in said well casing, movable means disposed in said packer unit mandrel bore, said movable means having a central flow passage and defining with said packer unit mandrel an annular flow passage within said mandrel bore, annular valve means on and movable with said movable means with respect to said mandrel for controlling flow through said annular flow passage, biasing means coupling said movable means with said packer unit mandrel and biasing said movable means and said valve means toward a position at which said annular valve means is closed, operator means engageable with said movable means for moving said annular valve means to and holding it at an open position; and a hanger unit including a mandrel provided with a longitudinal bore, said hanger unit mandrel and said packer unit mandrel having conengageable means for supporting said packer unit mandrel against downward movement in said well casing, locking means on said hanger unit mandrel engageable with said well casing for locking said mandrel against downward movement in said well casing, said movable means extending downwardly below said packer unit mandrel into said bore of said hanger unit mandrel and providing a central flow passage therein and defining with said hanger unit mandrel an annular flow passage in said hanger unit communicating at the upper end thereof with said annular flow passage of said packer unit mandrel, said hanger unit mandrel having means for supporting a tubing string in communication with said central flow passage of said movable means, and said hanger unit mandrel having port means communicating with said annular flow passage of said mandrel.

14. A well tool as defined in claim 13 including valve means supported in communication with said central flow passage of said movable means for controlling fluid flow therethrough.

15. A well tool as defined in claim 13 including valve means supported in said central flow passage of said movable means for controlling flow of fluids therethrough.

16. A well tool as defined in claim 13 wherein said movable means comprises tubular structure extending from the upper end of said packer unit mandrel and terminating within said hanger unit mandrel in slidable sealed relationship therein, and said biasing means coupling said movable means with said packer unit mandrel comprises spring means coupling said tubular structure with said packer unit mandrel for biasing said tubular structure and said annular valve means for movement with respect to said mandrel toward a closed position of said annular valve means.

17. A well tool as defined in claim 13 wherein said coengageable means includes: spacer means extending between said packer unit mandrel and said hanger unit mandrel for supporting and spacing said packer unit mandrel from said hanger unit mandrel.

18. In combination with the well tool of claim 13, wherein said operator member is movably supported in said well casing in engagement with said tubular structure; and control means at the surface end of said well casing is connected with said operator member and operable for moving said operator member and said tubular structure to a position in which said annular valve is in open position and for allowing said tubular structure to be moved to a position in which said annular valve is closed responsive to a change in a monitored surface condition, said operator member including tubing in flow communication with said central flow passage through said tubular structure for providing fluid communication from the surface through said central flow passages of said well tool into a tubing string supported from said hanger unit mandrel.

19. A well tool comprising: an upper packer unit including a mandrel having a longitudinal bore, said mandrel having a downwardly facing annular valve seat surface around said bore, a seal around said mandrel for sealing between said mandrel and a well casing, a locking assembly on said mandrel for locking said packer unit against upward movement in a well casing, a sleeve slidably disposed on an upper end portion of said mandrel coupled with said locking assembly providing means for supporting said packer unit from a handling tool and for moving said locking assembly between locked and unlocked relationship, longitudinal tubular means movably disposed coaxially through said bore of said mandrel providing a central flow passage therethrough and with said mandrel defining an annular flow passage through said mandrel around around said tubular means within said mandrel, an annular valve member on and movable with said tubular means into and out of engagement with said annular seat surface of said mandrel for controlling fluid flow through said annular flow passage of said mandrel, means including a spring coupling said tubular means with said mandrel biasing said tubular means and said annular valve member toward said annular seat surface of said mandrel, said tubular means having means therein for releasably supporting and locking a tubing safety valve therein for controlling fluid flow through said central flow passage provided by said tubular means, an upper portion of said tubular means being engageable by an operator member extending to said well tool for moving said tubular means and said annular valve member to a position at which said annular valve member is spaced from said annular seat surface at an open position, spacer and support means on the lower end of said packer unit mandrel; and a hanger unit including a mandrel having a longitudinal bore provided with a reduced lower end portion for receiving in slidable relationship a lower end portion of said tubular means of said packer unit, said tubular means providing a central flow passage through said hanger unit mandrel and with said hanger unit mandrel defining an annular flow passage through said bore of said hanger unit mandrel the upper end of said annular flow passage of said hanger unit mandrel being in communication with said annular flow passage of said packer unit mandrel, said hanger unit mandrel having port means communicating with said annular flow passage of said hanger unit mandrel to permit entry of fluid into said annular flow passage from below said well tool, means on said reduced lower end portion of said hanger unit mandrel for securing and supporting a tubing string in flow communication with said central flow passage of said tubular means of said well tool for conducting fluid therethrough separately from fluid flow through said well tool in said annular flow passages of said packer unit and said hanger unit, a locking assembly supported on said hanger unit mandrel engageable with said well casing for locking said mandrel against downward movement in said well casing, and an upper surface of said hanger unit mandrel engageable by said support and spacer means on said packer unit mandrel for supporting said packer unit mandrel against downward movement in said well casing and spacing said packer unit mandrel above said hanger unit mandrel.

20. A well tool as defined in claim 19 including: a tubing safety valve supported and locked in said supporting and locking means in said tubular means for controlling fluid flow through said control flow passage.

21. A well tool as defined in claim 20, wherein said tubing safety valve is insertable into and removable from said supporting and locking means of said tubular means without movement of said tubular means from said packer unit mandrel.

22. A well tool as defined in claim 19 in combination with an operator member having a flow passage therethrough engaged with an upper end portion of said tubular means, said operator member being adapted to move said tubular means and said annular valve member to a position in which said annular valve member is in open position, said operator member extending from a location remote from said well tool and having a bore in fluid communication with said central flow passage through said tubular means of said well tool.

References Cited

UNITED STATES PATENTS

| | | | |
|---|---|---|---|
| 1,644,748 | 10/1927 | Schweiger | 166—73 X |
| 2,447,546 | 8/1948 | Spencer | 166—123 X |
| 2,796,133 | 6/1957 | En Dean | 166—73 |
| 2,831,539 | 4/1958 | En Dean et al. | 166—73 |
| 2,841,224 | 7/1958 | Baker et al. | 166—129 X |
| 2,948,338 | 8/1960 | Raulins et al. | 166—123 |
| 2,963,089 | 12/1960 | Sizer | 166—72 |
| 3,375,874 | 4/1968 | Cherry et al. | 166—114 |

JAMES A. LEPPINK, Primary Examiner

I. A. CALVERT, Assistant Examiner

U.S. Cl. X.R.

166—129, 133, 226

PO-1050
(5/69)

UNITED STATES PATENT OFFICE
CERTIFICATE OF CORRECTION

Patent No. 3,491,831      Dated January 27, 1970

Inventor(s) William W. Dollison

It is certified that error appears in the above-identified patent and that said Letters Patent are hereby corrected as shown below:

```
Column  4, line 48, for "spirng" read --spring--
Column  5, line 26, for "comercially" read --commercially--
Column 10, line 14, for "condit" read --conduit--
Column 11, line 71, for "shoudler" insert --shoulder--
Column 13, line 53, for "movemnet" read --movement--
Column  6, line 28, for "216b" read --21bb--
Claim  4, line 4, for "second locking heads" read --second lockii
    surfaces for holding said locking heads--
Claim  4, line 7, for "positon" read --position--
Claim  9, line 3, for "indepdently" read --independently--
Claim 13, line 21, for "conengageable" read --coengageable--
Claim 19, line 16, omit "around" (first occurrence)
Claim 19, line 41, after "mandrel" insert a comma (,)
```

SIGNED AND
SEALED
AUG 18 1970

(SEAL)
Attest:

Edward M. Fletcher, Jr.
Attesting Officer

WILLIAM E. SCHUYLER, JR.
Commissioner of Patents